Patented Jan. 13, 1948

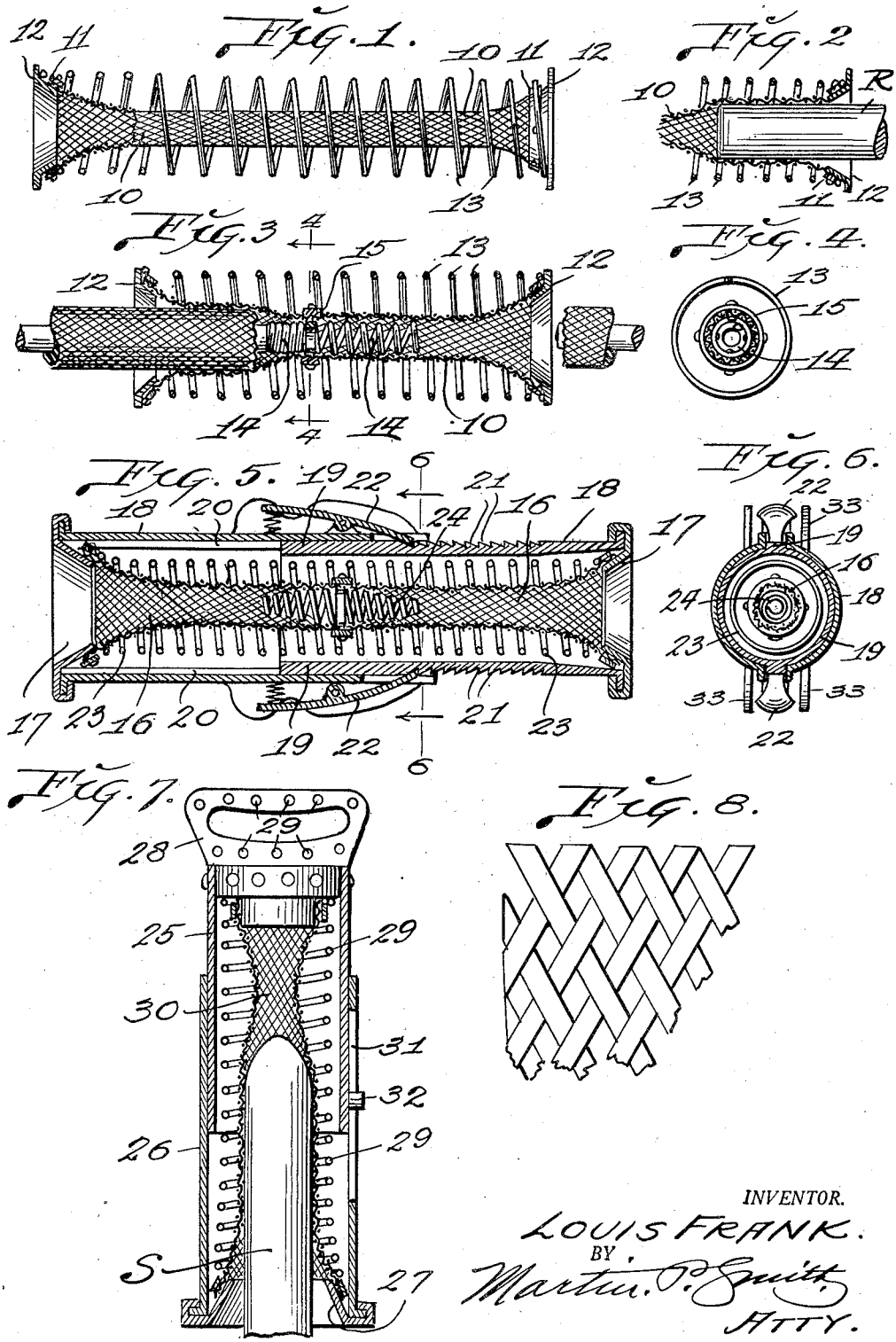

2,434,358

UNITED STATES PATENT OFFICE 2,434,358

CLAMPING CONNECTOR AND CARRIER

Louis Frank, Fellows, Calif.

Application August 4, 1943, Serial No. 497,331

2 Claims. (Cl. 174—84)

My invention relates to a tool especially intended for use as a clamping connector for rods, wires, cables and the like and which tool with slight modifications may be conveniently used for gripping, lifting and carrying ordnance shells and cartridges, particularly while same are in heated condition during manufacture.

The principal objects of my invention are, to provide a rod, wire or cable gripping and connecting tool, which is simple in structure, effective in performing the functions for which it is intended and the gripping or clamping of the rods or cables being dependent upon the contracting action of a tube woven from wire or the like, and which action may result from a lengthening of the tube due to the action of an expansive coil spring or from pulling strains impressed on the connected rods or cables.

When the tool is utilized for lifting and carrying shells or similar cylindrical objects, the tendency to lengthen and thereby contract this woven wire tube is brought about by the weight of the engaged shell or object.

A further object of my invention is to provide a clamping connector of the character referred to which is equipped with means for establishing electrical connection between current carrying wires or cables and which result is attained without the necessity for stripping the insulation from the connected conductors.

With the foregoing and other objects in view, my invention consists in certain novel features of construction and arrangement of parts which will be hereinafter more fully described and claimed and illustrated in the accompanying drawings, in which:

Fig. 1 is a side elevational view of a clamping connector constructed in accordance with my invention and with the woven wire gripping member in contracted condition.

Fig. 2 is a sectional view taken through one end portion of the tool and showing the gripping member expanded by an inserted rod or wire.

Fig. 3 is a longitudinal section taken through the center of the tool and showing same equipped with the electric contact means.

Fig. 4 is a cross section taken on the line 4—4 of Fig. 3.

Fig. 5 is a section taken through the center of a modified form of the connector.

Fig. 6 is a cross section taken on the line 6—6 of Fig. 5.

Fig. 7 is a longitudinal section taken through the center of the form of tool used for lifting and carrying shells and like objects.

Fig. 8 is a fragmentary view of a modified form of the woven gripping member.

Referring by numerals to the accompanying drawings and, particularly to the form of connector illustrated in Figs. 1 and 2, 10 designates a flexible tube composed of woven metal wire or from small strands of material such as flexible plastics or flexible glass and the weaving of said tube being such that it is normally contracted in diameter. Suitably secured on the ends of tube 10 in any suitable manner, preferably by means of riveted collars 11, are flaring rings 12 which are considerably larger in diameter than tube 10.

Surrounding the tube 10 is an expansive coil spring 13, the ends of which bear against the flanged rings 12 thus normally maintaining the tube 10 in extended condition and contracted circumferentially. To connect the adjacent ends of rods, cables or the like, the rings 12 are moved toward each other against the resistance offered by the spring 13 which action shortens the tube and increases the diameter thereof, thus enabling the ends of the rods, such as R, to be inserted through the flaring end rings 12 into the end portions of the tube 10 as illustrated in Fig. 2.

When pressure on the rings 12 is removed, spring 13 will act to move the rings apart thereby lengthening the tube 10 and contracting the same circumferentially so as to firmly grip the inserted ends of the rods and connect same.

In the construction illustrated in Figs. 3 and 4, the device is provided with means for establishing an electrical connection between the inserted ends of current carrying cables, and such means includes an expansive coil spring 14 of metal disposed in the central portion of the flexible tube 10, and the central portion of said spring being suitably connected to the tube, preferably by means of a riveted collar 15, which surrounds the center of said tube 10. Thus, the free ends of the spring 14 project in both directions from the center of tube 10 so that when current carrying cables are inserted in the ends of the flexible tube, the current carrying members of metal will directly contact the ends of the spring 14, thus electrically connecting said conductors.

In the modified construction illustrated in Figs. 5 and 6, a flexible tube 16 of woven wire or the like, and which is adapted to expand circumferentially as it is shortened has mounted on its ends flaring rings 17, the openings through which are considerably larger than the normal diameter of tube 16. Secured to the rings 17 are the outer ends of tubes 18, the inner portions of which telescope one another, and formed on the inner end of the inner one of these tubes are longitudinally disposed ribs 19 which are adapted to slide in longitudinally disposed grooves 20 formed in the inner face of the outer tube.

Formed on the outer surface of the inner one of the telescopic tubes in longitudinally disposed alinement with the ribs 19 are longitudinally disposed rows of ratchet teeth 21 and mounted on the inner end of the outer one of the tubes 18 are spring pressed detents 22, the points of which engage said ratchet teeth. The shoulders at the ends of the ratchet teeth in one row are staggered or offset with respect to the shoulder of the teeth in the other row in order to give a finer degree of longitudinal adjustment to the telescoping tubes when the ends of rods, cables or the like are inserted therein.

Surrounding the woven wire tubes 16 is an expansive coil spring 23 the ends of which bear against the rings 17 and which spring yieldingly resists movement of the telescoping tubes toward each other. If desired, an electrical contact member, preferably in the form of an expansive coil spring 24, practically identical with the spring 14, may be secured within the center of tube 16 so as to electrically connect the inserted ends of electric conductors.

In this form of connector, the movement of the telescoping tubes 18 toward each other is normally prevented by the engagement of the points of the detents 22 with the ratchet teeth 21 and to enable the tubes 18 to be moved toward each other, it is necessary to apply pressure to the rear ends of the detents 22 so as to disengage their points from the ratchet teeth 21.

The construction illustrated in Fig. 7 is designed for the lifting, handling and carrying of substantially cylindrical objects, such as ordnance shells, particularly while the same are in heated condition during manufacture, and this form of device comprises inner and outer telescopic tubes 25 and 26 respectively with the lower end of outer tube 26 provided with a flaring ring 27.

Secured in the upper end of the inner telescopic tube 25 is a handle 28 preferably formed of plastics, or the like, and which may be perforated as designated by 29 in order to disseminate heat and interposed between said handle and the flaring ring 27 is an expansive coil spring 29.

A flexible tube 30 of woven wire or the like is concentrically arranged within the coil spring 29 with the ends of said tube being connected respectively to handle 28 and ring 27. This tube 30 contracts circumferentially as it is lengthened and increases in size circumferentially as it is shortened. To maintain the telescopic tubes 25 and 26 against separation, the outer tube 26 may be provided with a longitudinally disposed slot 31 into which projects a stud 32 which latter is seated in the wall of the inner tube 25.

In the use of the device as just described, the lower portion of said device is moved downwardly upon a shell such as S or other substantially cylindrical article so that the latter enters and expands the lower portion of flexible tube 30 and as the device is lifted, the tube 30 will contract and grip the shell or other object so as to enable the same to be readily handled and carried from one point to another.

In Fig. 8, I have illustrated an expanding and contracting element composed of woven strips of thin narrow ribbon-like material which may be either metal, plastics or flexible glass and which construction is particularly advantageous in the larger sizes of the gripping, connecting and lifting devices.

Where my improved clamping connector is used for connecting the ends of electric conductors, practically all parts of the tool may be composed of plastics or other suitable insulating material.

Thus, it will be seen that I have provided a clamping connector and lifting device which is simple in construction, inexpensive of manufacture and very effective in performing the functions for which it is intended. It will be understood that minor changes in the size, form and construction of the various parts of my improved clamping connector may be made and substituted for those herein shown and described without departing from the spirit of my invention, the scope of which is set forth in the appended claims.

I claim as my invention:

1. A clamping connector comprising a tube composed of flexible material adapted to expand circumferentially when shortened and to contract when lengthened, rings located on the ends of said tube, means for yieldingly resisting the movement of said rings toward each other a ring disposed within and secured to the center of said expansible tube and an expansive coil spring disposed within and having its central portion secured to said ring with its free portions extending in both directions towards the ends of said expansible tube.

2. A clamp connector comprising a tube composed of flexible material which tube is adapted to increase in size diametrically as it is shortened and to contract diametrically as it is lengthened both ends of said tube being flared outwardly, outwardly flared rings located on the flared ends of said tube, an expansive coil spring surrounding said tube and arranged between said rings, a ring secured to the center of said tube, and an expansible coil spring having its central portion secured to said ring with its free end portions extending in both directions toward the ends of said expansible tube which ring and expansible coil spring are disposed axially within said expansible tube.

LOUIS FRANK.

REFERENCES CITED

The following references are of record in the file of this patent:

UNITED STATES PATENTS

| Number | Name | Date |
| --- | --- | --- |
| 428,755 | Hawes | May 27, 1890 |
| 545,911 | Reilly | Sept. 10, 1895 |
| 839,260 | Benson | Dec. 25, 1906 |
| 1,854,783 | Cook | Apr. 19, 1932 |
| 1,997,649 | Ohlund | Apr. 16, 1935 |
| 2,268,598 | Kellems | Jan. 6, 1942 |
| 2,311,767 | Lumbard | Feb. 23, 1943 |
| 2,316,890 | Rockne | Apr. 20, 1943 |
| 2,318,164 | Kellems | May 4, 1943 |